United States Patent [19]

Inoue et al.

[11] 4,226,627

[45] Oct. 7, 1980

[54] OPTICAL GLASS

[75] Inventors: Satoshi Inoue, Sagamihara; Fujio Komorita, Hachioji, both of Japan

[73] Assignee: Kabushiki Kaisha Ohara Kogaku Garasu Seizosho, Kanagawa, Japan

[21] Appl. No.: 48,196

[22] Filed: Jun. 13, 1979

[30] Foreign Application Priority Data

Jun. 21, 1978 [JP] Japan .................................. 53-74289

[51] Int. Cl.$^3$ .......................... C03C 3/08; C03C 3/14
[52] U.S. Cl. .................................... 106/47 Q; 106/54
[58] Field of Search ................................ 106/47 Q, 54

[56] References Cited

U.S. PATENT DOCUMENTS

| 3,615,762 | 10/1971 | Parry et al. | 106/47 Q |
| 3,958,999 | 5/1976 | Izumitani et al. | 106/47 Q |
| 4,080,216 | 3/1978 | Ishibashi et al. | 106/47 Q |
| 4,111,707 | 9/1978 | Komorita et al. | 106/47 Q |
| 4,118,238 | 10/1978 | Ishibashi et al. | 106/47 Q |
| 4,119,471 | 10/1978 | Komorita et al. | 106/47 Q |
| 4,120,732 | 10/1978 | Komorita et al. | 106/47 Q |
| 4,128,432 | 12/1978 | Komorita et al. | 106/47 Q |

*Primary Examiner*—O. R. Vertiz
*Assistant Examiner*—Mark Bell
*Attorney, Agent, or Firm*—Ladas & Parry

[57] ABSTRACT

An optical glass of a $B_2O_3$—$SiO_2$—$La_2O_3$—$Yb_2O_3$ system and additionally containing $SnO_2$ is stable in spectral transmissivity, is scarcely liable to tinting and has high refractive and low dispersive characteristics.

1 Claim, 4 Drawing Figures

OPTICAL GLASS

BACKGROUND OF THE INVENTION

This invention relates to an optical glass and, more particularly, to an optical glass of a $B_2O_3$—$SiO_2$—$SnO_2$—$La_2O_3$—$Yb_2O_3$ system which is stable in spectral transmissivity and is scarcely liable to tinting and has optical constants in a high refractive and low dispersive region on the left side of a line a connecting a point where nd is 1.68 and $\nu$d is 56.0 and a point where nd is 1.82 and $\nu$d is 45.0 in the co-ordinates shown in FIG. 1 of the accompanying drawings.

There is disclosed in Japanese laid-open patent publication 2717/1976 an optical glass which has substantially the same optical constants as the present invention and consists essentially of a $B_2O_3$—$La_2O_3$—$Yb_2O_3$ system. This prior art optical glass is not stable in spectral transmissivity due to its melting conditions and besides is liable to tinting. The prior art optical glass therefore is disadvantageous when it is used as high grade lenses suitable for taking colour pictures.

SUMMARY OF THE INVENTION

It is, therefore, an object of the present invention to provide an optical glass which has eliminated the above described disadvantage of the prior art optical glass.

Laborious studies and experiments made by the inventors of the present invention have resulted in a finding that instability in spectral transmissivity due to variation in melting conditions can be prevented and a tendency to tinting can be decreased by introducing $SnO_2$ as an essential ingredient into an optical glass of a $B_2O_3$—$SiO_2$—$La_2O_3$—$Yb_2O_3$ system.

According to the present invention, there is provided an optical glass having refractive index (nd) within a range of 1.68 to 1.82 and Abbé number ($\nu$d) greater than values on a line connecting a point where nd is 1.68 and $\nu$d is 56.0 and a point where nd is 1.82 and $\nu$d is 45.0 in an nd—$\nu$d rectangular coordinates representative of optical constants and substantially consisting of a composition in weight percent of 17.0-45.0% $B_2O_3$, 0.5-10.0% $SiO_2$, the total of said $B_2O_3$ and $SiO_2$ being 24.0 to 47.0%, 0.05 to 4.0% $SnO_2$ 20.0 to 50.0% $La_2O_3$ 1.0 to 35.0% $Yb_2O_3$, 0 to 35.0% $Gd_2O_3$, 0 to 15.0% $Y_2O_3$, the total of said $La_2O_3$, $Yb_2O_3$, $Gd_2O_3$ and $Y_2O_3$ being 43.0 to 68.0%, 0 to 3.0% $Al_2O_3$, 0 to 5.0% $GeO_2$, 0 to 10.0% $ZrO_2$, 0 to 8.0% $Ta_2O_5$, 0 to 3.0% $Nb_2O_5$, 0 to 5.0% MgO, 0 to 10.0% CaO, 0 to 10.0% SrO, 0 to 10.0% BaO, 0 to 8.0% ZnO, the total of said MgO, CaO, SrO, BaO and ZnO being 0 to 10.0%, one or more ingredients selected from the group consisting of $Li_2O$, $Na_2O$ and $K_2O$, the total of said $Li_2O$, $Na_2O$ and $K_2O$ being 0 to 0.5%, a fluoride or fluorides in substitution, in part or in whole, for the oxide or oxides of the same element or elements as said fluoride or fluorides among the ingredients of said composition, the total amount of F contained in said fluoride or fluorides being 0 to 8.0%, and 0 to 0.2% $As_2O_3$ and/or $Sb_2O_3$.

BRIEF DESCRIPTION OF THE DRAWINGS

In the accompanying drawings.

DETAILED DESCRIPTION OF THE INVENTION

Figure 1:
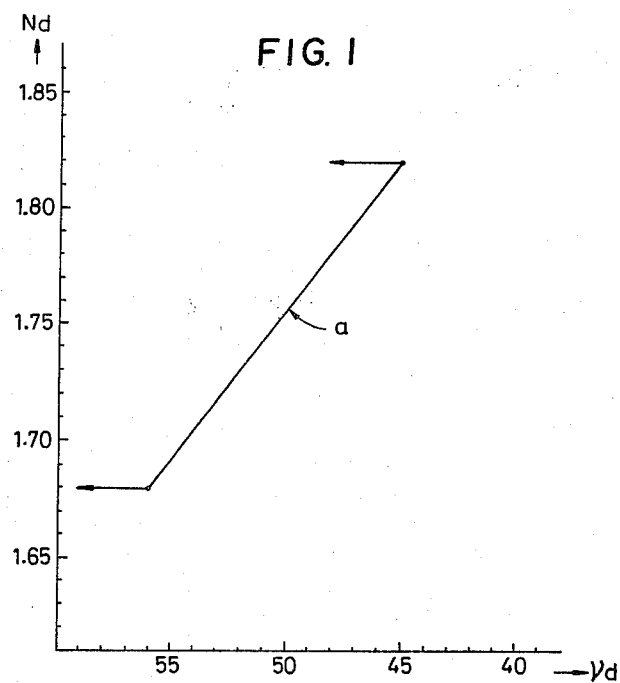
FIG. 1 is a graphical diagram showing the optical constant region of the optical glass according to the present invention.

In the optical glass made according to the present invention, the above described content ranges of the respective ingredients have been selected for reasons stated below.

If the content of $B_2O_3$ is less than 17%, a devitrification tendency increases whereas if it exceeds 45%, desired optical constants cannot be obtained.

$SiO_2$ contributes to increasing viscosity of the glass and decreasing devitrification and it is particularly an indispensable ingredient in melting of the glass in a large production scale. If the content of $SiO_2$ is less then 0.5%, the effect of decreasing devitrification is remarkably reduced whereas if the content exceeds 10%, the $SiO_2$ material becomes hard to melt so that a homogeneous glass cannot be obtained.

If the total amount of $B_2O_3$ and $SiO_2$ is less than 24%, the devitrification tendency increases whereas if it exceeds 47%, the desired optical constants cannot be maintained.

In the optical glass according to the present invention, $SnO_2$ is effective for preventing instability in spectral transmissivity caused by variation in melting conditions and decreasing the tendency to tinting. Besides, $SnO_2$ contributes to preventing devitrification. If, however, the content of $SnO_2$ is less than 0.05%, these effects cannot be obtained to a satisfactory degree, whereas if the content of $SnO_2$ exceeds 4.0%, the glass is extremely tinted contrary to expectation.

$La_2O_3$ is an important ingredient for providing high refractive and low dispersive characteristics to the glass. If the content thereof is less than 20%, the desired optical constants cannot be obtained whereas if it exceeds 50%, devitrification remarkably increases.

$Yb_2O_3$ is an essential ingredient for the optical glass of the present invention having high refractive and low dispersive characteristics, for $Yb_2O_3$ provides the glass with optical properties which are closely similar to those of $La_2O_3$ without adversely affecting resistivity to devitrification. If the content of $Yb_2O_3$ is less than 1.0%, such effect cannot be obtained to a satisfactory extent. The content exceeding 35.0% is undesirable because devitrification increases.

The following ingredients may be included in the optical glass according to the present invention within the prescribed content ranges for preventing devitrification, improving melting property, correcting optical constants and like purposes.

$Gd_2O_3$ and $Y_2O_3$ respectively provide the glass with optical properties resembling those of $La_2O_3$ and besides make the glass stable. If, however, the contents of $Gd_2O_3$ and $Y_2O_3$ exceed 35.0% and 15.0% respectively, devitrification remarkably increases. Further, if the total amount of these ingredients and $La_2O_3$ and $Yb_2O_3$ is less than 43.0%, the desired optical constants cannot be obtained whereas if the total amount exceeds 68.0%, devitrification remarkably increases.

$Al_2O_3$ is effective for increasing viscosity of the glass and decreasing devitrification, but if the content thereof exceeds 3.0%, devitrification increases.

$GeO_2$ is useful ingredient for making the glass stable. If the content thereof exceeds 5.0%, it occasions increase in dispersion and the desired optical constants cannot be obtained.

$ZrO_2$ is an effective ingredient for increasing refractivity and making the glass stable. If the content thereof exceeds 10.0%, melting of $ZrO_2$ into the glass becomes difficult.

$Ta_2O_5$ and $Nb_2O_5$ are effective ingredients for increasing refractivity and making the glass stable. If the contents thereof exceed 8.0% and 3.0% respectively, dispersion increases and the desired optical constants cannot be obtained.

MgO, CaO, SrO, BaO and ZnO are effective for readily homogenizing the glass. If the respective contents of these ingredients exceed 5.0%, 10.0%, 10.0%, 10.0% and 8.0%, the tendency to devitrification sharply increases. Further, the total amount of these ingredients should not exceed 10.0%, for if it exceeds 10.0%, the tendency to devitrification increases.

$Li_2O$, $Na_2O$ and $K_2O$ facilitate melting of the $SiO_2$ material into the glass and homogenizing the glass. If, however, the total amount of one or more of these ingredients exceeds 0.5%, the devitrification tendency sharply increases.

F is a useful ingredient for lowering a liquidus temperature and decreasing devitrification if it is included in the glass by substituting, in part or in whole, one or more of the above described metal oxides by corresponding fluoride or fluorides, e.g. NaF, $CaF_2$, $BaF_2$, $AlF_3$, $LaF_3$ etc. If the content thereof exceeds 8.0%, a homogenous glass cannot be obtained.

$As_2O_3$ and/or $Sb_2O_3$ is employed for defoaming of the glass. If the contents thereof exceeds 0.2%, the devitrification tendency sharply increases.

Examples of compositions of the optical glass according to the present invention are shown in Table 1 under No. 1 through No. 20. Refractive indices and Abbe values of these examples are shown in Table 2. In Tables 1 and 2, glasses designated by reference characters S1 through S5 are prior art glasses listed for comparison. The glass S1 resembles the composition of the glass No. 3, the glass S2 resembles the glass No. 5 and the glass S3 resembles the glass No. 12. These prior art glasses S1, S2 and S3 all have optical constants which come within the high refractive and low dispersive optical property region of the optical glass according to the present invention but they are different from the glass of the present invention in that they do not contain $SnO_2$. The glass S4 is of a higher refractivity and lower despersion than the glass of the present invention. The glass S5 is of a refractivity range which is similar to that of the glass of the present invention but its Abbé value falls short of the condition for the glass of the present invention.

Table 2 shows, with respect to the examples No. 1 through No. 20 and the prior art glasses S1 through S5, light wavelength at which transmissivity is 80% in two glass specimens (A) and (B) obtained under different melting conditions and difference $\Delta\lambda$ between the specimens (A) and (B) in the wavelengths at which transmissivity is 80%. The specimen (A) is obtained by melting the material at 1350° C. for two hours, and thereafter cooling the melt promptly and casting it in a mould. The specimen (B) is obtained by melting the material at 1350° C. for two hours, maintaining the melt at 1200° C. for three hours, and thereafter cooling the melt promptly and casting it in a mould.

As will be apparent from Table 2, difference $\Delta\lambda$ in the 80% transmissivity wavelength between the specimens (A) and (B) is 0 to 3 in the optical glass according to the invention, whereas $\Delta\lambda$ is a relatively large value of 13 to 15 in the glasses S1–S3 which are of compositions similar to the present invention except that they do not contain $SnO_2$. The effect of the present invention will be apparent from the comparison of the values of $\Delta\lambda$. It would be noted that a glass such as S4 which is of extremely high refractive and low dispersive characteristics, i.e., a glass having optical constants outside of the range of optical constants of the present invention, can have a smaller value of $\Delta\lambda$ if it contains $SnO_2$ but the devitrification tendency increases by inclusion of $SnO_2$ to such a degree that melting of the glass in a large scale becomes difficult. Accordingly, addition of $SnO_2$ in such extremely high refractive, low dispersive glass is not proper. A glass such as S5 having optical constants outside of the range of optical constants of the present invention contains a great deal of $Ta_2O_5$, is stable in its spectral transmissivity, and is not liable to tinting, so that there is no need for adding $SnO_2$. Further, generally speaking, glasses of optical constants which are on the right side of the line a in FIG. 1 can be readily produced without adding expensive $Yb_2O_3$ as in the glass according to the invention.

Figure 2:
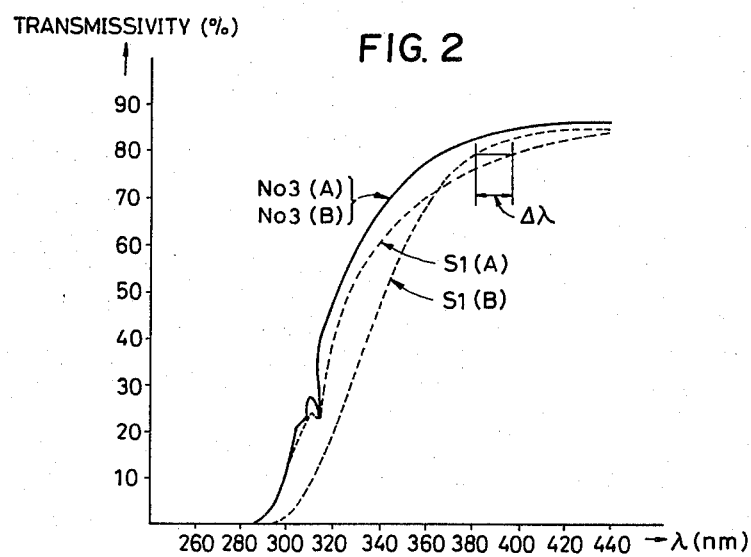
FIGS. 2 through 4 are graphical diagram showing variations in spectral transmissivity caused by differences in melting conditions of the optical glass of the present invention in comparison with those of prior art optical glasses.
Figure 3:
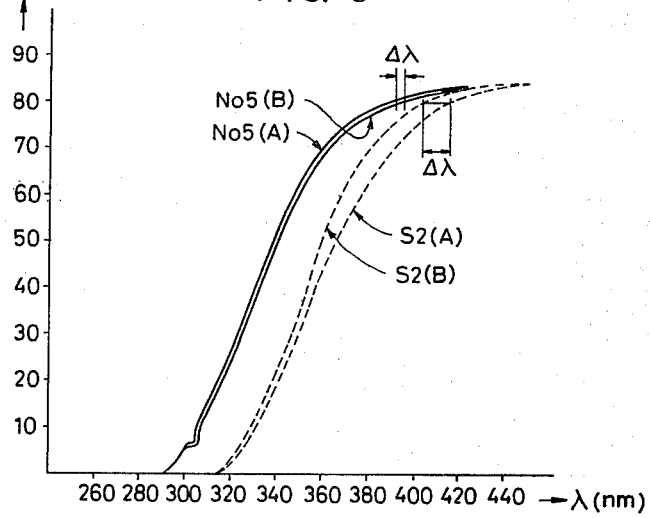

FIG. 2 shows results of comparing spectral transmissivity of the specimen (A) with that of the specimen (B) with respect to the glass No. 3 and the prior art glass S1 which is of a composition similar to that of the glass No. 3 but including no $SnO_2$. FIG. 3 shows results of like comparison with respect to the glass No. 5 and the glass S2, and FIG. 4 those with respect to the glass No. 12 and the glass S3.

Figure 4:
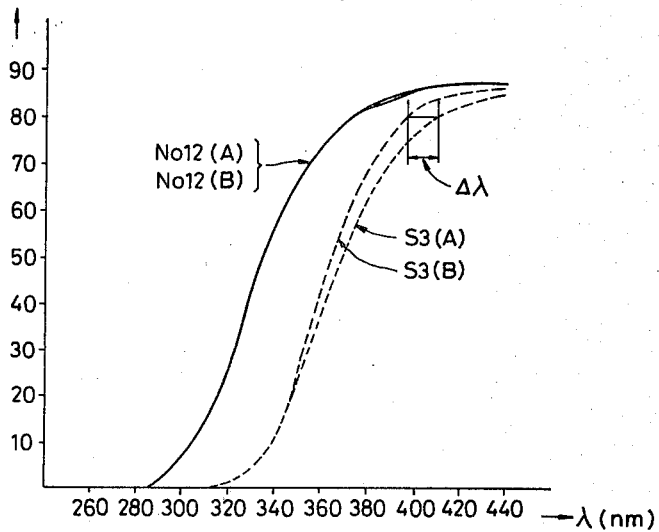

It will be understood from FIGS. 2 through 4 that there are noticeable differences in the spectral transmissivity curves of the prior art glasses S1 through S3 depending upon melting conditions so that these prior art glasses are not stable, whereas there is no substantial difference in the spectral transmissivity curves of the glasses of the present invention despite the differences in the melting conditions so that the optical glass of the present invention is very stable. Besides, the transmissivity of the optical glass of the present invention is by far superior to that of the prior art glasses.

As described in the foregoing, the optical glasses according to the present invention has an extremely high refractive and low dispersive optical property range on the left side of the line a connecting the point where nd is 1.68 and νd is 56.0 and the point where nd is 1.82 and νd is 45.0 in the nd—νd rectangular coordinates. In comparison with the prior art optical glasses, the optical glass according to the present invention has a high resistivity to tinting and its spectral transmissivity does not substantially change despite variation in the melting conditions. Accordingly, it is most suited for a material of a high grade lens for taking a color picture.

The optical glass according to the invention can be readily manufactured by melting a batch of oxides, carbonates, nitrates, fluorides etc. at 1300° C.–1400° C. in a platinum crucible or the like, defoaming and stirring the molten glass to homogenize it, lowering the temperature, casting the molten glass into a mould and thereafter annealing it.

TABLE 1

| Example | B$_2$O$_3$ | SiO$_2$ | SnO$_2$ | La$_2$O$_3$ | Yb$_2$O$_3$ | Others | | | | |
|---|---|---|---|---|---|---|---|---|---|---|
| No. 1 | 30.0 | 4.0 | 1.0 | 42.0 | 23.0 | | | | | |
| No. 2 | 32.0 | 1.0 | 1.5 | 40.0 | 25.5 | | | | | |
| No. 3 | 36.0 | 1.5 | 1.5 | 38.0 | 18.0 | Gd$_2$O$_3$ 5.0 | | | | |
| No. 4 | 21.2 | 10.0 | 0.5 | 35.0 | 10.0 | Gd$_2$O$_3$ 23.0 | Li$_2$O 0.3 | | | |
| No. 5 | 28.4 | 1.0 | 0.6 | 34.0 | 16.0 | Gd$_2$O$_3$ 10.0 | ZrO$_2$ 10.0 | | | |
| No. 6 | 28.5 | 0.5 | 0.3 | 40.0 | 7.0 | Gd$_2$O$_3$ 14.0 | ZrO$_2$ 4.7 | GeO$_2$ 5.0 | | |
| No. 7 | 32.0 | 1.5 | 0.5 | 20.0 | 1.0 | Gd$_2$O$_3$ 35.0 | BaO 10.0 | | | |
| No. 8 | 17.0 | 7.0 | 0.8 | 30.0 | 2.4 | Gd$_2$O$_3$ 30.0 | ZrO$_3$ 4.8 | Ta$_2$O$_5$ 8.0 | | |
| No. 9 | 36.5 | 1.7 | 3.0 | 33.0 | 5.0 | Gd$_2$O$_3$ 19.0 | BaO 1.5 | Li$_2$O 0.3 | | |
| No. 10 | 35.8 | 3.2 | 0.8 | 36.0 | 1.0 | Y$_2$O$_3$ 15.0 | ZrO$_2$ 5.7 | CaO 2.5 | | |
| No. 11 | 32.0 | 5.5 | 2.0 | 50.0 | 10.0 | Li$_2$O 0.5 | | | | |
| No. 12 | 45.0 | 2.0 | 0.5 | 33.0 | 10.0 | CaO 9.5 | | | | |
| No. 13 | 42.0 | 0.9 | 0.3 | 40.0 | 5.6 | Al$_2$O$_3$ 3.0 | MgO 5.0 | SrO 3.0 | Sb$_2$O$_3$ 0.2 | |
| No. 14 | 41.0 | 4.6 | 0.05 | 38.0 | 5.65 | BaO 2.0 | ZnO 8.0 | Na$_2$O 0.3 | K$_2$O 0.2 | AS$_2$O$_3$ 0.2 |
| No. 15 | 39.0 | 5.1 | 1.0 | 39.0 | 5.9 | SrO 10.0 | | | | |
| No. 16 | 40.7 | 3.1 | 4.0 | 40.0 | 5.7 | CaO 6.0 | K$_2$O 0.5 | | | |
| No. 17 | 29.0 | 2.4 | 0.6 | 25.0 | 35.0 | ZrO$_2$ 7.0 | ZnO 1.0 | | | |
| No. 18 | 33.5 | 1.0 | 0.1 | 47.4 | 15.0 | Nb$_2$O$_5$ 3.0 | | | | |
| No. 19 | 37.3 | 2.1 | 0.5 | 20.0 | 8.4 | CaO 4.2 | | LaF$_3$ 27.5 | | |
| No. 20 | 41.0 | 1.0 | 0.1 | 35.1 | 12.2 | Li$_2$O 0.5 | SrF$_2$ 3.6 | LaF$_3$ 6.5 | | |
| S 1 | 36.0 | 1.0 | | 41.0 | 18.0 | Gd$_2$O$_3$ 4.0 | | | | |
| S 2 | 28.5 | 1.0 | | 34.2 | 16.1 | Gd$_2$O$_3$ 10.1 | ZrO$_2$ 10.1 | | | |
| S 3 | 44.0 | 1.0 | | 35.0 | 10.0 | CaO 10.0 | | | | |
| S 4 | 21.9 | | | 33.3 | 14.3 | Ta$_2$O$_5$ 25.7 | WO$_3$ 4.8 | | | |
| S 5 | 28.6 | | | 38.1 | 16.2 | Ta$_2$O$_5$ 12.3 | Al$_2$O$_3$ 4.8 | | | |

TABLE 2

| | Optical constants | | 80% transmissivity wavelength (nm) | | Δλ |
|---|---|---|---|---|---|
| Example | nd | νd | (A) | (B) | (nm) |
| No. 1 | 1.7418 | 53.5 | 382 | 380 | 2 |
| No. 2 | 1.7460 | 53.4 | 395 | 396 | 1 |
| No. 3 | 1.7250 | 54.8 | 369 | 368 | 1 |
| No. 4 | 1.7585 | 52.4 | 370 | 370 | 0 |
| No. 5 | 1.7845 | 49.5 | 385 | 388 | 3 |
| No. 6 | 1.7740 | 50.3 | 374 | 374 | 0 |
| No. 7 | 1.7290 | 54.6 | 385 | 383 | 2 |
| No. 8 | 1.8200 | 46.3 | 400 | 400 | 0 |
| No. 9 | 1.7250 | 54.3 | 392 | 393 | 1 |
| No. 10 | 1.7375 | 52.6 | 375 | 375 | 0 |
| No. 11 | 1.7343 | 54.0 | 388 | 388 | 0 |
| No. 12 | 1.6805 | 57.7 | 375 | 377 | 2 |
| No. 13 | 1.6858 | 56.1 | 384 | 383 | 1 |
| No. 14 | 1.6948 | 55.6 | 389 | 386 | 3 |
| No. 15 | 1.6920 | 56.1 | 368 | 368 | 0 |
| No. 16 | 1.7030 | 55.8 | 390 | 392 | 2 |
| No. 17 | 1.7610 | 50.9 | 382 | 382 | 0 |
| No. 18 | 1.7586 | 50.8 | 392 | 394 | 2 |
| No. 19 | 1.6858 | 58.2 | 372 | 372 | 0 |
| No. 20 | 1.7048 | 57.2 | 370 | 370 | 0 |
| S 1 | 1.7255 | 54.7 | 397 | 382 | 15 |
| S 2 | 1.7842 | 59.5 | 414 | 401 | 13 |
| S 3 | 1.6893 | 56.6 | 410 | 397 | 13 |
| S 4 | 1.8379 | 40.0 | 425 | 416 | 9 |
| S 5 | 1.7660 | 46.7 | 380 | 382 | 2 |

What is claimed is:

1. An optical glass having refractive index (nd) within a range of 1.68 to 1.82 and Abbe number (νd) greater than values on a line connecting a point where nd is 1.68 and νd is 56.0 and a point where nd is 1.82 and νd is 45.0 in an nd−νd rectangular coordinates representative of optical constants and substantially consisting of a composition in weight percent of 17.0 to 45.0% B$_2$O$_3$, 0.5 to 10.0% SiO$_2$, the total of said B$_2$O$_3$ and SiO$_2$ being 24.0 to 47.0%, 0.05 to 4.0% SnO$_2$, 20.0 to 50.0% La$_2$O$_3$ 1.0 to 35.0% Yb$_2$O$_3$, 0 to 35.0% Gd$_2$O$_3$, 0 to 15.0% Y$_2$O$_3$ the total of said La$_2$O$_3$, Yb$_2$O$_3$, Gd$_2$O$_3$ and Y$_2$O$_3$ being 43.0 to 68.0%, 0 to 3.0% Al$_2$O$_3$, 0 to 5.0% GeO$_2$, 0 to 10.0% ZrO$_2$, 0 to 8.0% Ta$_2$O$_5$, 0 to 3.0% Nb$_2$O$_5$, 0 to 5.0% MgO, 0 to 10.0% CaO, 0 to 10.0% SrO, 0 to 10.0% BaO, 0 to 8.0% ZnO, the total of said MgO, CaO, SrO, BaO and ZnO being 0 to 10.0%, one or more ingredients selected from the group consisting of Li$_2$O, Na$_2$O and K$_2$O, the total of said Li$_2$O, Na$_2$O and K$_2$O being 0 to 0.5%, a fluoride or fluorides in substitution, in part or in whole, for the oxide or oxides of the same element or elements as said fluoride or fluorides among the ingredients of said composition, the total amount of F contained in said fluoride or fluorides being 0 to 8.0%, and 0 to 0.2% As$_2$O$_3$ and/or Sb$_2$O$_3$.